US006908253B2

(12) United States Patent
Harvey

(10) Patent No.: US 6,908,253 B2
(45) Date of Patent: Jun. 21, 2005

(54) SPLIT SLITTER

(76) Inventor: John B. Harvey, N6642 Highway 45, New London, WI (US) 54961

( * ) Notice: Subject to any disclaimer, the term of this patent is extended or adjusted under 35 U.S.C. 154(b) by 87 days.

(21) Appl. No.: 09/939,516

(22) Filed: Aug. 24, 2001

(65) Prior Publication Data

US 2003/0037658 A1 Feb. 27, 2003

(51) Int. Cl.[7] .................................................. F16B 2/02

(52) U.S. Cl. ...................... 403/344; 403/310; 403/311; 83/698.41; 83/675

(58) Field of Search ................................ 403/340, 344, 403/345, 13, 24, 309–312; 83/698.41, 673, 675, 345

(56) References Cited

U.S. PATENT DOCUMENTS 465,552 A * 12/1891 Barnes ...................... 403/311
727,707 A * 5/1903 Stauffer et al. ............ 403/344
732,111 A 6/1903 Perkins
744,917 A 11/1903 Houldsworth
772,634 A 10/1904 Snyder
2,488,309 A 11/1949 Mason
3,659,490 A 5/1972 Buck
3,751,080 A 8/1973 Bailey et al.
3,889,553 A 6/1975 Ballheimer
4,422,348 A 12/1983 Campbell
4,506,559 A 3/1985 Francke et al.
4,570,517 A * 2/1986 Souza et al. .................. 83/838
4,637,807 A 1/1987 Koelling, Sr.
RE32,693 E 6/1988 Winfield
4,964,842 A * 10/1990 Howard ...................... 474/152
5,085,535 A * 2/1992 Solberg et al. ............... 403/24
5,531,536 A * 7/1996 Blanchfield et al. ........ 403/340

* cited by examiner

*Primary Examiner*—Daniel P. Stodola
*Assistant Examiner*—Michael P. Ferguson
(74) *Attorney, Agent, or Firm*—Joseph W. Byme

(57) ABSTRACT

A mating arrangement for a split slitter, anvil, spacer or any other similar device provides for precision alignment of the two halves of the split slitter in both the axial and radial directions.

4 Claims, 7 Drawing Sheets

SPLIT SLITTER

FIELD OF THE INVENTION

The present invention relates generally to split slitters, anvils, spacers and other similar devices, used in the paper, film and foil industries for slitting a wide web of material into a plurality of smaller individual packets or rolls. More specifically, it relates to a mating arrangement for providing precision alignment of the two halves of split slitters, anvils, spacers and other similar devices in both the axial and radial directions.

BACKGROUND OF THE INVENTION

It is typical in the paper, film and foil industries to first form a wide web of material which is later cut into smaller, individual rolls or packets. The web, typically provided as a roll, passes continuously over the knife edge of a plurality of spaced apart slitters. The slitters slit the web into a plurality of individual rolls that are wound on separate take-up rollers for packaging and shipping.

A bottom slitter or anvil is typically used in conjunction with a circular top slitter having a sharp cutting edge. The bottom slitter typically is a cylinder having a marginal wall section that is tapered inwardly at an angle of about three degrees to provide a knife edge. The cutting edge of the top slitter contacts the knife edge of the bottom slitter. The bottom slitter rotates on a shaft in one direction while the top knife is rotated in the opposite direction. The web is thereby cut as it passes between the top and bottom slitters.

A bottom slitter is typically manufactured either as a single unitary piece, or as two halves or semi-circular members. Slitters made from two halves are known in the industry as a split slitters or bands. In the case of a split slitter, each half is placed on a drive shaft and the mating ends or surfaces are aligned with each other. The two semi-circular members are then rigidly connected to each other using conventional fasteners.

Achieving proper alignment between the two halves is very important. A small misalignment between the two halves can result in a mis-matched cutting edge resulting in a chipped top slitter blade. Misalignment can also disturb the direction of the cut and/or can result in frayed edges. To insure proper performance, the two slitter halves must fit together and be precision aligned in both the radial direction and in the axial direction. To achieve this precision, the mating ends of the two halves are typically precision machined to tight tolerances. For example, typically the mating ends of the slitter members must fit together in both the axial and radial directions within a tolerance range of from zero clearance to 0.0002 inches.

As mentioned, the two semi-circular halves of prior art slitters typically have precision machined mating ends These mating ends typically incorporate some form of tongue and groove arrangement (e.g., male and female keyways) to provide the precision alignment between the two slitter halves. For example, many prior art slitters utilize complicated lands or projections on the mating surface of one halve that are received in complicated recesses or pockets in the matting surface of the other halve. Because they are complicated structures with many surfaces and corners, these prior art lands and recesses require substantial machining time and are expensive to manufacture.

U.S. Pat. Nos. 5,085,535 and 5,531,536, for example, each disclose a mating arrangement that includes a multilevel land and a complimentary multi-level recess disposed to receive the multi-level land. Insertion of the multi-level land into the multi-level recess during engagement of the two slitter halves insures that the desired axial and radial alignment will be achieved.

The mating arrangement disclosed in U.S. Pat. No. 5,085,535, which issued on Feb. 4, 1992 to Solberg et al. and is incorporated by referenced herein, includes a multi-level recess on one of the mating ends. The deepest of the recesses, which provides for axial alignment of the two slitter halves, extends through the entire radial width of the mating end. In other words, the deepest recess is not centrally disposed on the mating surface in which it projects, but rather extends all the way to the outside surfaces of the slitter. The tallest portion of the multilevel land received in this recess, however, does not extend the entire radial width of the split slitter, but rather is centrally disposed inward from the outer radial edges (and surfaces) of the mating end and therefore does not completely fill the recess. As a result, the two ends of the recess used for axial alignment open up to the outer and inner radial surfaces of the slitter. This results in an exposed open slot being present on the outer and inner radial surfaces of the slitter.

Similarly, the arrangement disclosed in U.S. Pat. No. 5,531,536, which issued on Jul. 2, 1996, to Blanchfield et al., and which is also incorporated by referenced herein, also includes a multi-level recess. The deepest of the recesses, which provides for radial alignment of the two slitter halves, extends through the entire axial width of the mating end. The tallest portion of the multilevel land that is received in this recess, however, also does not extend the entire axial width of the slitter, but rather is centrally disposed inward from the outer axial edges (and surfaces) of the mating end. As a result, the two ends of the recess used for axial alignment open up to the outer and inner axial surfaces of the slitter, thus forming an exposed open slot on each of outer axial surfaces of the slitter.

The slots formed on the outer slitter surfaces by the open recesses can be problematic. Any burrs that are present around the recess openings will have a tendency to collect dust and paper fibers as the web passes over the slitter. This can be especially problematic with respect to the opening that appears on the outer radial surface of the slitter because the web rides on that surface. As the paper fibers collect, they form a ball that can place a dent in the web as the web passes over the slitter.

To alleviate the potential for such dust and paper fiber collection, the recess openings are typically deburred during manufacturing of the slitter. The deburring process, however, is time consuming and labor intensive for it typically is performed by hand filing. It is therefore desirable to have a slitter and mating arrangement that does not have any keying or recess openings on the outside surfaces of the slitter. Preferably, the male and female keys (e.g, lands and recesses) will be completely enclosed or hidden inside of the slitter when the two halves are mated together.

The prior art keying arrangements disclosed in U.S. Pat. Nos. 5,085,535 and 5,531,536 also require a significant amount of time to precision machine. This is because each mating end includes three surface levels (e.g, a mating surface and a two level land or recess). Each of these surface levels is typically first rough cut and then precision cut. As a result, a total of six machining operations or passes are required to precision machine these keying arrangements. It is desirable to have a mating arrangement that requires less machining time to manufacture. Preferably, the mating arrangement will have no more than two surface levels (e.g, a mating surface and a single-level land or recess).

Another problem with the prior art slitters disclosed in U.S. Pat. Nos. 5,085,535 and 5,531,536 relates to the numerous right angle (e.g., square) corners that are prevalent on each mating end between the various keying elements. The square corners increase the likelihood that stress cracking will occur during heat treating of the slitter. Cracked slitters must be scrapped. The square corners are also susceptible to being damaged during repeated assembly and disassembly of the two slitter halves. It is desirable therefore to provide a mating arrangement that minimizes the number of square corners that are present. Preferably, the corners and edges of the keying elements will be chamfered or beveled to minimize the likelihood of cracking and to provide a lead-in taper during assembly of the slitter halves.

The presence of square corners along the top edge of the lands and along the top edges of the recesses can also become problematic if the cutting tools used for machining the recesses become worn. This is because a worn cutting tool will inevitably result in an undesirable radius forming in the recess corners formed between the recess sidewalls and the bottom surface of the recess. An undesirable radius can also form between the land sidewalls and the mating surface from which they project. These undesirable radii can interfere with square corners along the top edge of the land or along the top edge of the recess, essentially blocking the land from fully seating in the recess when the land is received in the recess. It is desirable, therefore to chamfer or bevel the top edges of the lands and the top edges of the recess to provide clearance between the top land edge and the bottom corners of the recess and between the top recess edge and the corners located at the bottom of the land sidewalls.

A prior art method from a different art that is used for aligning two parts in both the radial and axial direction involves the use of cylindrical (round) machined dowel pins and drilled holes. This method for aligning two parts, however, does not provide the desired level of precision that is necessary for split slitters and other similar devices that require tight tolerancing. This is because of the clearance requirements that are necessary in order for the machined dowel pin to be received in the drilled hole. These clearance tolerances fall outside of the tolerancing limits that are required to maintain the precision alignment between the two halves of split slitters. As a result, machined dowel pins and drilled holes cannot be used to provide the axial and radial alignment that is needed for the construction of properly aligned split slitters.

SUMMARY OF THE PRESENT INVENTION

According to a first aspect of the invention, a slitter apparatus includes first and second semi-circular members. The first semicircular member has first and second mating surfaces. The second semi-circular member has first and second mating surfaces complimentary to the opposed first and second mating surfaces of the first member. The first member is engageable with the second member to form on engagement a cylindrical body. A first rectangular land having a plurality of sidewall surfaces projects from one of the first or second mating surfaces of the first semi-circular member. The corners formed between adjacent sidewall surfaces of the first rectangular land are radiused. A first rectangular recess having a plurality of sidewall surfaces projects into one of the first or second mating surfaces of the second semi-circular member. The first rectangular recess is interengageable with the first rectangular land to provide axial and radial alignment of the first member with the second member.

In one embodiment, the slitter the corners formed between adjacent sidewall surfaces of the first rectangular recess are also radiused. In another embodiment, the radius of each corner formed between adjacent sidewall surfaces of the first rectangular recess is less than the radius of the corresponding corner formed between adjacent sidewall surfaces of the first rectangular land. The corners formed between adjacent sidewall surfaces of the first rectangular recess are chamfered in an alternative embodiment.

In one embodiment, a second rectangular land having a plurality of sidewall surfaces projects from the other of the first or second mating surfaces of the first member. The corners formed between adjacent sidewall surfaces of the second rectangular land are radiused in this embodiment. A second rectangular recess having a plurality of sidewall surfaces projects into the other of the first or second mating surfaces of the second member. The second rectangular recess is interengageable with the second rectangular land to provide axial and radial alignment of the first member with the second member.

The first rectangular land is interengageable with the first rectangular recess and the first rectangular land is not interengageable with the second rectangular recess in another embodiment. The first and second semi-circular members may be connected together only in one way to form the cylindrical body in this embodiment.

In another embodiment, a second rectangular land having a plurality of sidewall surfaces projects from the other of the first or second mating surfaces of the second member. The corners formed between adjacent sidewall surfaces of the second rectangular land are radiused in this embodiment. A second rectangular recess having a plurality of sidewall surfaces projects into the other of the first or second mating surfaces of the first member. The second rectangular recess is interengageable with the second rectangular land to provide axial and radial alignment of the first member with the second member in this embodiment.

The first rectangular land is centrally disposed inward from the outer edges of the mating surface from which it projects in yet another embodiment. The first rectangular recess is centrally disposed inward from the outer edges of the mating surface into which it projects in this embodiment such that upon engagement of the first member with the second member, the first rectangular land and the first rectangular recess are completely enclosed inside of the cylindrical body.

The first land is integral with the mating surface from which it projects in one other embodiment.

According to a second aspect of the invention, a slitter apparatus includes a first semi-circular member having a first mating surface and a second semi-circular member having a second mating surface engageable with the first mating surface to form a cylindrical body. A rectangular land projects from the first mating surface of the first semi-circular member. The land includes no more than one planar surface substantially parallel to the first mating surface. A rectangular recess protrudes into the second mating surface of the second semi-circular member wherein the recess includes no more than one planar surface substantially parallel to the second mating surface. Engagement of the land with the recess provides both axial and radial alignment of the first semi-circular member with the second semi-circular member.

In one embodiment, the land includes a plurality of sidewall surfaces projecting from the first mating surface. The corners formed between adjacent sidewall surfaces of the rectangular land are chamfered in this embodiment. In another embodiment, the recess includes a plurality of sidewall surfaces projecting into the second mating surface. The corners formed between adjacent sidewall surfaces of the rectangular recess are chamfered in this other embodiment. The length of the chamfer on each corner formed between adjacent sidewall surfaces of the rectangular recess is less than the length of the chamfer on the corresponding corner formed between adjacent sidewall surfaces of the rectangular land in one other embodiment.

In another embodiment, the land includes a plurality of sidewall surfaces projecting from the first mating surface. The corners formed between adjacent sidewall surfaces of the rectangular land are radiused in this embodiment. The recess includes a plurality of sidewall surfaces projecting into the second mating surface. The corners formed between adjacent sidewall surfaces of the rectangular recess are radiused in this embodiment. The radius of each corner formed between adjacent sidewall surfaces of the rectangular recess is less than the radius of the corresponding corner formed between adjacent sidewall surfaces of the rectangular land in yet another embodiment.

The rectangular land is centrally disposed on the first mating surface and the rectangular recess is centrally disposed in the second mating surface in one other embodiment. The rectangular land is integral with the first mating surface in another embodiment.

According to a third aspect of the invention, a slitter apparatus includes a first semi-circular member having a first mating surface and a second semi-circular member having a second mating surface engageable with the first mating surface to form a cylindrical body. A land projects from the first mating surface wherein the land is centrally disposed inward from the outer edges of the first mating surface such that upon engagement of the first semi-circular member with the second semi-circular member, the land is hidden inside of the cylindrical body. A recess projects into the second mating surface wherein the recess is centrally disposed inward from the outer edges of the second mating surface such that upon engagement of the first semi-circular member with the second semi-circular member, the recess is hidden inside of the cylindrical body. The land includes a first pair of planar alignment surfaces and a third pair of planar alignment surfaces. The recess includes a second pair of planar alignment surfaces complimentary to the first pair of planar alignment surfaces and a fourth pair of planar alignment surfaces complimentary to the third pair of planar alignment surfaces. Contact of the first pair of planar alignment surfaces with the second pair of planar alignment surfaces when the land is received in the recess provides axial alignment of the first semi-circular member with the second semi-circular member. Contact of the third pair of planar alignment surfaces with the fourth pair of planar alignment surfaces when the land is received in the recess provides radial alignment of the first semi-circular member with the second semi-circular member.

Other principal features and advantages of the invention will become apparent to those skilled in the art upon review of the following drawings, the detailed description and the appended claims.

Figure 1:
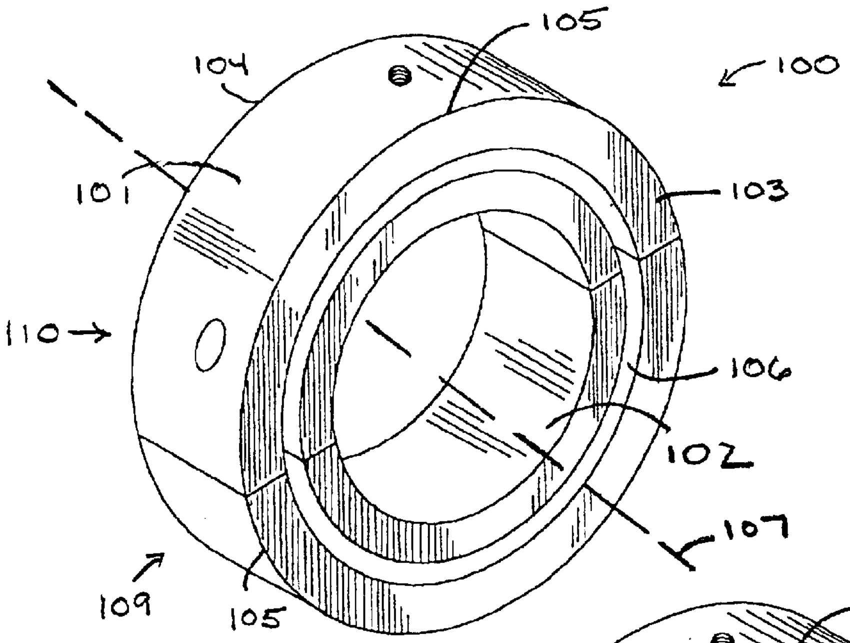
FIG. 1 shows an isometric view of a split slitter with the two slitter members mated according to one embodiment of the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular slitter having a particular configuration and particular features, the present invention is not limited to this configuration or to these features and other slitter configurations and features can be used. Likewise, although the present invention will be illustrated with reference to slitters, anvils and spacers, the present invention is not limited to these particular devices. Rather, the present invention can be used in any application or with any device where it is desirable to precision align two parts in two directions (e.g., axially and radially). It is also not necessary that the parts be cylindrical or circular in shape. The present invention can be used with any two parts requiring alignment in two directions including square shaped parts, rectangularly shaped parts and irregularly shaped parts.

The present invention is also not limited to use in the paper, film or foil industries and may have application in other industries. By way of example only, the present invention can also be used in the power transmission industry to precision align the two halves of split gears and split sprockets.

Generally, the present invention involves a cylindrical slitter apparatus that is formed from two substantially semi-circular halve members. Each member includes first and second planar mating surfaces located on first and second mating ends respectively. The mating surfaces on the first of the two members are complimentary to the mating surfaces on the other of the two members such that upon engagement of the first member with the second member, the two members form the cylindrical slitter with the two members precision aligned in both the radial and axial directions.

Mating surface, as used herein in connection with the mating end of a member, includes any continuous unbroken planar surface that extends between or touches any two of the outer surfaces of the member (e.g., the outer surfaces of the slitter shown in FIG. 1 are surfaces 101, 102, 103 and 104). Defined another way, a mating surface includes those planar surfaces on one mating end that actually come in physical contact with a planar surface on a complimentary mating end that is parallel or substantially parallel to the mating surface. Note that the top planar surfaces of lands generally do not contact the bottom planar surfaces of recesses (rather a clearance gap is generally left between these two surfaces) so neither the top planar surfaces of lands nor the bottom planar surfaces of recesses are mating surfaces as that term is used herein. Complimentary, as used herein with reference to members, mating ends or mating surfaces, means that the two members, mating ends or mating surfaces can be interconnected to form a single body, such as a cylindrical slitter body.

Centrally disposed, as used herein with reference to lands and recesses, means that no sidewall of the land or recess extends to or touches any of the outer surfaces of the member. Put another way, a land or recess is centrally disposed on a mating end or surface if it is completely enclosed (hidden) when the two members are mated together.

The precision alignment in both the radial and axial directions that is required for the slitter is provided by a pair of centrally disposed rectangular lands and recesses. The lands or protrusions are located on the mating surfaces of one of the substantially semi-circular halve members and the complimentary recesses are located in the mating surfaces of the other of the substantially semi-circular halve members. The lands and recesses have only a single-level and are centrally disposed inward from the outer edges of the mating surface in this embodiment.

Precision alignment, as used herein, means any alignment wherein the mating tolerances of the two parts to be aligned are between no clearance and 0.0002 inches. Desired alignment, as used herein, for a particular application utilizing a mating arrangement according to the present invention means that degree of alignment between the two parts to be mated that allows the resulting part to be used for its intended purpose in that particular application. Desired alignment as described above may be a range of values and may vary from application to application depending on the specifics of the application.

Radial and axial alignment of the two members is provided by contacting the opposed planar sidewall surfaces of the lands with the opposed planar sidewall surfaces of the recesses when the lands are received in the recesses. The land corners formed between adjacent land sidewalls are radiused to a desired value in one embodiment to provide a clearance gap between the corners of the land and the corners of the recess when the land is received in the recess. Likewise, the recess corners formed between adjacent sidewalls of the recess are also radiused to a desired value in another embodiment. The radius placed on the lands in this embodiment is greater than the radius placed on the recesses in this embodiment to insure that there is a clearance gap between the land corners and the recess corners when the land is received in the recess.

Radius, desired radius or desired radius value, as used herein in connection with land and recess corners, means a radius, intentionally placed on either a corner or an edge, that is sufficient to allow a land to be received in a recess without interference from the undesirable radius that is present in the corners of recesses and around the base of lands as a result of worn cutting tools or as a result of some other manufacturing or machining flaw. The desired radius or desired radius values may be a discreet value or may be a range of values and may vary from application to application depending on the specifics of the application. Radius, desired radius or desired radius value, as used herein in connection with land and recess corners, does not include undesirable radii.

Undesirable radius, as used herein, means the radius that is present as a result of a worn cutting tool or as a result of some other manufacturing or machining flaw. In machining slitters, it is customary to keep undesirable radii below 0.005 inches by changing the cutting tools on a regular basis, although there is no requirement that they be kept below this level.

The top edge of the land is chamfered in one embodiment. Likewise, the top edge surrounding the recess is also chamfered in this embodiment. In another embodiment, only the top edged of the land is chamfered. The chamfers placed on these edges provide a lead in taper for the land when it is being inserted into the recess thus making the parts easier to assemble. The chamfers also eliminate the square corners that would otherwise be present along the top edges of the lands and the recesses. Elimination of the square corners reduces the likelihood that stress cracking of the mating ends will occur and further reduces the likelihood that the mating ends will be damaged during repeated assembly and disassembly of the slitter halves.

The centrally disposed lands used for alignment are integral with the mating surface from which they project in one embodiment. Integral, as used herein in connection with lands and mating surfaces, means that the lands and the mating surfaces are both machined into the mating end. In other words, the lands and the recesses are always part of the same unitary piece of material. Integral, as used herein, does not include lands that are manufactured as a separate part and then later attached to or inserted into the mating surface or mating end such as by press fit or by welding. In other embodiments, the lands are not integral with the mating surface. For example, in one alternative embodiment, the lands are press fit into the mating surface.

FIG. 1 shows a cylindrical split slitter 100 having first and second radial surfaces 101, 102 and a pair of opposed axial surfaces 103, 104. Slitter 100 is precision machined from D2 tool steel in this embodiment. Radial surface 101 is disposed on the outside diameter of slitter 100 while radial surface 102 is disposed on the inside diameter of slitter 100. It is typical to incline one or both of axial surfaces 103, 104 at an angle of about three degrees, thereby providing a knife edge 105 around the outer circumference of slitter 100.

A circumferential groove 106 is disposed in each of axial surfaces 103, 104. Groove 106 is provided to facilitate re-sharpening of slitter knife edge 105 as is well understood by those of skill in the art. Groove 106 also serves as a dust groove to collect dust or dirt that is produced during the slitting operation.

Figure 2:
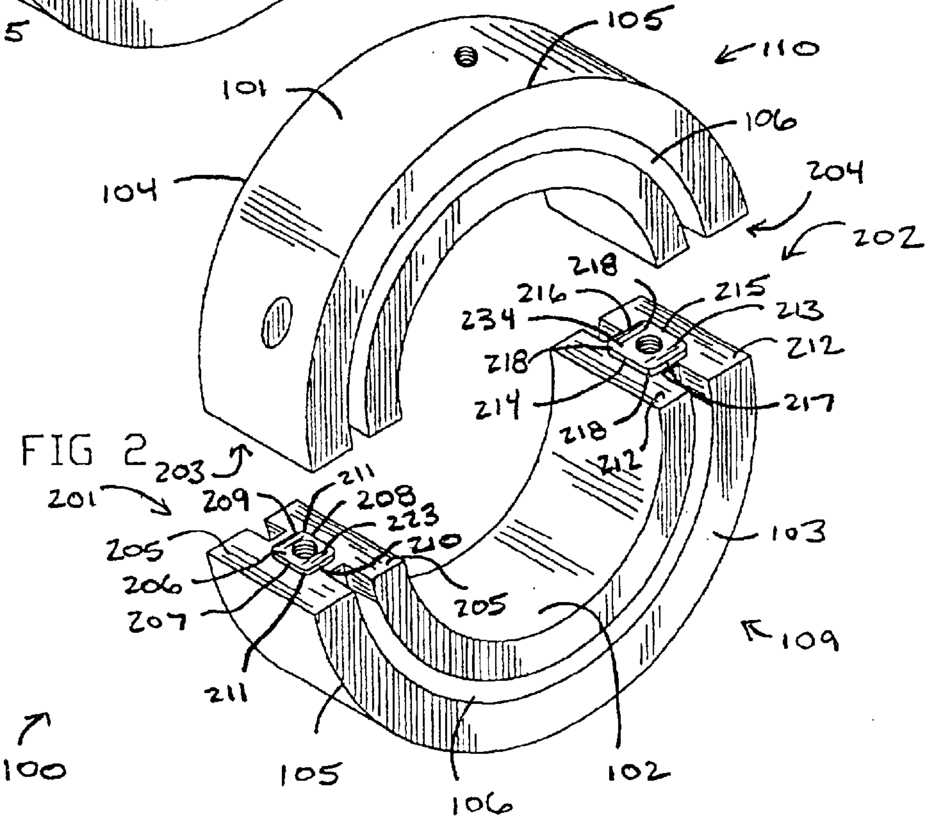
FIG. 2 shows an isometric view of the split slitter of FIG. 1 with the top and bottom slitter members unmated.

Circumferential groove 106 can either be centered on axial surfaces 103, 104 between radial surfaces 101 and 102 as is shown in FIGS. 1 and 2 or it can be offset from the center. For example, circumferential groove 106 is disposed closer to outside radial surface 101 in the split slitter shown in FIGS. 15–17. In addition to groove 106, outer radial surface 101 may include a groove or annular recess (not shown) to facilitate tooling and machining while inner radial surface 102 may include a groove or annular recess (also not shown) to lessen contact with the shaft on which slitter 100 is mounted. It should be noted that in other embodiments of the present invention, one or more of these grooves or recesses are not present.

As shown in FIG. 2, the slitter is comprised of two semi-circular halve members 109, 110 that are interconnected to form cylindrical slitter 100. Slitter 100 is cylindrical about an axis 107 in this embodiment. Semicircular members 109 and 110 are joined to each other and are engageable with each other at their mating ends 201, 202, 203 and 204. Each mating end in this embodiment includes a mating surface having either a centrally disposed land projecting outward from the mating surface or a centrally disposed recess projecting into the mating surface. The centrally disposed lands are received in the centrally disposed recesses to provide both axial and radial alignment of semi-circular member 109 with semi-circular member 110.

FIGS. 2, 3, 5 and 6 show in greater detail the features of mating ends 201, 202, 203 and 204 of the slitter of FIG. 1. First, with reference to semi-circular member 109, this member includes a first mating end 201 and a second mating end 202. Mating end 201 includes a planar mating surface 205 and a substantially rectangular land 206 (also referred to as a protrusion or male key) protruding outward or extending above planar mating surface 205.

Rectangular land, as used herein, includes square shaped lands as well as rectangular lands that have radiused, beveled or angled corners. Likewise, rectangular recess, as used herein, includes square shaped recesses as well as rectangular recesses that have radiused, beveled or angled corners.

Land 206 is a single-level land having only one planar surface 233 (e.g., the top surface of land 206) parallel or substantially parallel to planar mating surface 205. Land 206 is also centrally disposed on mating surface 205 inward from outer surfaces 101, 102, 103, 104 of slitter 100. Land 206 includes a first pair of parallel (or substantially parallel) opposed planar sidewall surfaces 207, 208 and a second pair of parallel (or substantially parallel) opposed planar sidewall surfaces 209, 210. Sidewall surfaces 207, 208 are perpendicular or substantially perpendicular to their adjacent sidewall surfaces 209, 210 in this embodiment. Each corner 211 formed between adjacent planar sidewall surfaces of land 206 are radiused in this embodiment to a desired radius value. In other embodiments, corners 211 are not radiused to a desired value.

It should be noted that in other embodiments, each of the opposed planar surfaces 207, 208 (and 209, 210) are not parallel with each other, but rather are angled with respect to each other. Likewise, in other embodiments, planar surfaces 207, 208 are not perpendicular to their adjacent surfaces 209, 210, but rather are oriented at an angle other than 90 degrees. For example, land 205 could be a parallelogram having adjacent sidewall surfaces that are oriented at less than or greater than 90 degrees with respect to each other.

It should also be understood that although planar sidewall surfaces 207, 208, 209 and 210 are perpendicular (or substantially perpendicular) to planar mating surface 205 in this embodiment, this is not a requirement of the present invention. In an alternative embodiment, these planar sidewall surfaces are oriented at an angle that is less than 90 degrees with respect to planar mating surface 205 (e.g, land 206 is tapered).

In a similar manner to mating end 201, mating end 202 includes a planar mating surface 212 and a rectangular land or protrusion 213 protruding outward or extending above planar mating surface 212. Land 213 is also a single-level land having only one planar surface 234 (e.g., the top surface of land 213) parallel or substantially parallel to planar mating surface 212. Land 213 is centrally disposed on mating surface 212 inward from outer surfaces 101, 102, 103, 104 of slitter 100.

Land 213 includes a first pair of parallel (or substantially parallel) opposed planar sidewall surfaces 214, 215 and a second pair of parallel (or substantially parallel) opposed planar sidewall surfaces 216, 217. Sidewall surfaces 214, 215 are perpendicular or substantially perpendicular to surfaces 216, 217 in this embodiment. Like land 206, each corner 218 formed between adjacent planar sidewall surfaces of land 213 are radiused in this embodiment to a desired radius value.

Figure 3:
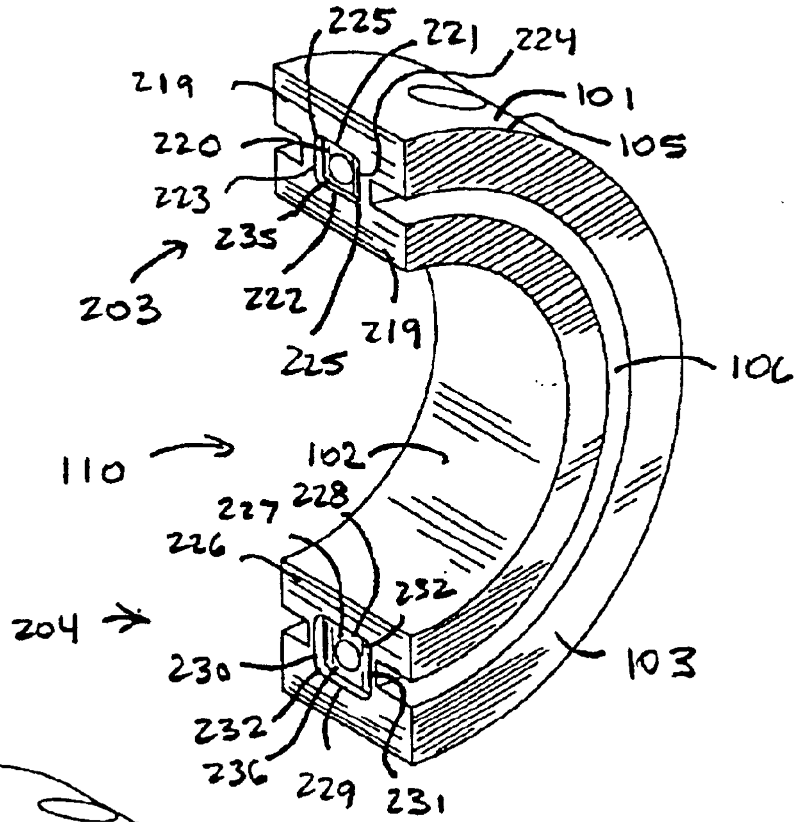
FIG. 3 shows an isometric view of the top slitter member of the split slitter of FIG. 1.
Figure 6:
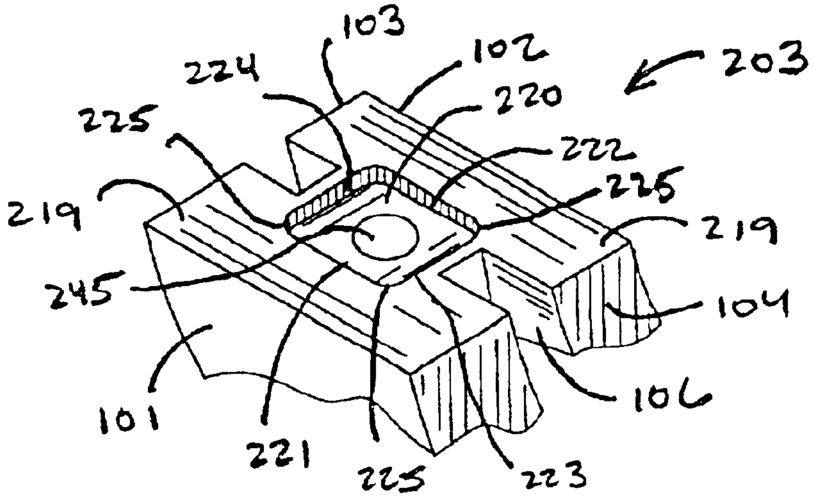
FIG. 6 shows an isometric close-up view of one of the mating ends of the top slitter member of the split slitter of FIG. 1.

With reference now to the other semi-circular member 110, this member includes a first mating end 203 and a second mating end 204 (see FIGS. 3 and 6). Mating end 203 is complimentary to mating end 201 and includes a planar mating surface 219 and a substantially rectangular recess 220 (also referred to as a pocket or female key) protruding inward or extending into planar mating surface 219.

Recess 220 is a single-level recess having only one planar surface 235 (e.g., the bottom surface of recess 220) parallel or substantially parallel to planar mating surface 219. Recess 220 is centrally disposed on mating surface 219 inward from outer surfaces 101, 102, 103, 104. Recess 220 includes a first pair of parallel (or substantially parallel) opposed planar sidewall surfaces 221, 222 and a second pair of parallel (or substantially parallel) opposed planar sidewall surfaces 223, 224. Sidewall surfaces 221, 222 are perpendicular or substantially perpendicular to surfaces 223, 224 in this embodiment. Each corner 225 formed between adjacent planar sidewall surfaces of recess 220 are radiused in this embodiment to a desired radius value. In other embodiments, however, corners 225 are not radiused to a desired value.

It should be noted that in other embodiments, each of the opposed planar surfaces 221, 222 (and 223, 224) are not parallel with each other, but rather are angled with respect to each other. Likewise, in other embodiments, planar surfaces 221, 222 are not perpendicular to their adjacent surfaces 223, 224, but rather are oriented at an angle other than 90 degrees. For example, recess 220 could be a parallelogram having adjacent sidewall surfaces that are oriented at less than or greater than 90 degrees with respect to each other.

It should also be understood that although planar sidewall surfaces 221, 222, 223 and 224 are perpendicular (or substantially perpendicular) to planar mating surface 219 in this embodiment, this is not a requirement of the present invention. In an alternative embodiment, these planar sidewall surfaces are oriented at an angle that is greater than 90 degrees with respect to planar mating surface 219.

Mating end 204, which is similar to mating end 203 and complimentary to mating end 202, includes a planar mating surface 226 and a substantially rectangular recess 227 protruding inward or extending into planar mating surface 226. Recess 227 is also a single-level recess having only one planar surface 236 (e.g., the bottom surface of recess 227) parallel or substantially parallel to planar mating surface 226. Recess 227 is centrally disposed on mating surface 226 inward from outer surfaces 101, 102, 103, 104 of slitter 100.

Recess 227 includes a first pair of parallel (or substantially parallel) opposed planar sidewall surfaces 228, 229 and a second pair of parallel (or substantially parallel) opposed planar sidewall surfaces 230, 231. Sidewall surfaces 228, 229 are perpendicular or substantially perpendicular to surfaces 230, 231 in this embodiment. Each corner 232 formed between adjacent planar sidewall surfaces of recess 227 are also radiused in this embodiment to a desired radius value.

In the embodiment of FIG. 1, land 206 and recess 220 are complimentary to each other as are land 213 and recess 227. Upon engagement of member 109 with member 110, lands 206 and 213 are received in recesses 220 and 227 respectively. Once engaged, the opposed sidewalls of each land contact or engage the corresponding opposed sidewalls of each recess to provide the desired precision alignment in both the axial and radial directions between members 109 and 110. In other words, the planar sidewall surfaces of the lands and the recesses are alignment surfaces for aligning the two slitter members.

For example, planar sidewall surfaces 207, 208 of land 206 contact sidewall surfaces 221, 222 respectively of recess 220 when land 206 is received in recess 220 to provide radial alignment of mating end 201 with mating end 203. Similarly, planar sidewall surfaces 214, 215 of land 213 contact planar sidewall surfaces 228, 229 respectively of recess 227 when land 213 is received in recess 227 to provide radial alignment of mating end 202 with mating end 204. Axial alignment of mating end 201 with mating end 203 is provided by contacting planar sidewall surfaces 209, 210 of land 206 with planar sidewall surfaces 223, 224 respectively of recess 220. Finally, axial alignment of mating end 202 with mating end 204 is provided by contacting planar sidewall surfaces 216, 217 of land 213 with planar sidewall surfaces 230, 231 respectively of recess 227.

It should be noted that although the alignment surfaces so far described have all been planar alignment surfaces, in other embodiments, the alignment surfaces (e.g., sidewalls of the lands and recesses) are substantially planar. Substantially planar alignment surface, as used here, includes any machined surface that can be used as an alignment surface in combination with another alignment surface to provide precision alignment between two mating parts.

Figure 20:
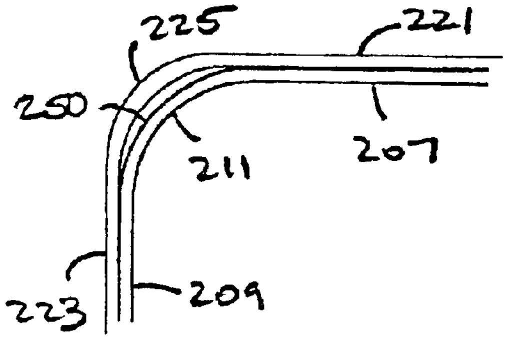
FIG. 20 shows a land having radiused corners received in a recess also having radiused corners according to another embodiment of the present invention.

The four corners 211, 218 of each land 206, 213 respectively are radiused to a desired value in the embodiment of FIG. 1 to provide a clearance gap 250 (see FIG. 20) between the four corresponding corners of recesses 220 and 227 when the lands are disposed in the recesses. Radiusing the corners of each land insures that there will be clearance between the corners of the land and the corners of the recess receiving the land. In addition to radiusing the corners 211, 218 of each land, the corners 225, 232 of each recess 220, 227 respectively are also radiused to a desired value in the embodiment of FIG. 1.

To further insure that there is no interference between the corners of the lands and the corners of the recesses receiving the lands, the desired radius placed on each land corner 211, 218 is greater than the desired radius placed on each corresponding recess corner 225, 232 in this embodiment. For example, in one embodiment, the radius on the land corners is 0.156 inches while the radius on the recess corners is 0.125 inches. Other embodiments have other desired radius values.

As a general guideline, however, a difference of 0.030 inches or more between the desired land corner radius and the recess corner radius is sufficient. A difference of 0.030 inches will typically be sufficient to overcome any interpolation errors that occur during machining of the mating surfaces with the cutting tools moving at a reasonable speed. The present invention, however, is not limited to these differences and other differences can be used.

Another feature of the present invention as shown in the embodiment of FIG. 1 is the sizing of the various lands and recesses. Land 213, for example, is larger in the axial direction than land 206. Recess 227, which is complementary to land 206, is accordingly also larger in the axial direction than recess 220. In the embodiment of FIG. 1 for example, land 206 is 0.500 inches in the axial direction while land 213 is 0.600 inches long in that direction.

The benefit to making one of the land/recess combinations larger than the other land/recess combination is that members 109 and 110 can only be assembled in one way. This prevents either of the members from being reversed when the two members are mated together. Assembling slitter 100 with either of the two members 109, 110 reversed can result in a mismatched cutting edge 105.

In an alternative embodiment, the radial dimension of the lands and the recesses differ resulting in one land/recess combination being larger than the other land/recess combination in the radial direction. In yet another embodiment, the lands differ in both the radial and the axial directions. In one other embodiment, the lands and recesses all have the same dimensions such that each land is complimentary to, and engageable with, each recess.

Another advantage to the present invention as illustrated by the embodiment shown in FIG. 1 is that lands 206 and 213 are single-level lands. Similarly, recesses 220 and 227 are single-level recesses. Single-level, as used herein, means that the lands and recesses have at most one planar surface that is parallel or substantially parallel to the planar mating surface from which the lands project and into which the recesses protrude. In, other words, the lands have only one planar top surface and the recesses have only one planar bottom surface.

As a result, precision alignment of the two semicircular slitter members is achieved in both the axial and radial directions using simple, uncomplicated single-level lands and single-level recesses. One advantage to using single-level lands and single level recesses is that each mating end has only two planar surfaces parallel or substantially parallel to the mating plane 243 (see FIG. 17) of the semi-circular halve members. As a result, only two rough machining cuts and two precision machining cuts are required to precision machine mating ends 201, 202, 203, 204 of members 109 and 110. This results in a 33 percent reduction in the amount of machining time required to precision machine each mating end compared to the prior art mating ends which each have three planar surface levels parallel to the mating plane.

In addition, because the planar mating surfaces of mating ends 201, 202, 203 and 204 are less complicated, larger cutting tools can be used to precision machine the mating ends resulting in even less machining time. It is estimated that the overall machining time required to precision machine the mating ends of members 109, 110 is reduced by 40 percent as compared to the machining time required to precision machine the mating ends of the slitters described in U.S. Pat. Nos. 5,085,535 and 5,531,536.

Figure 17:
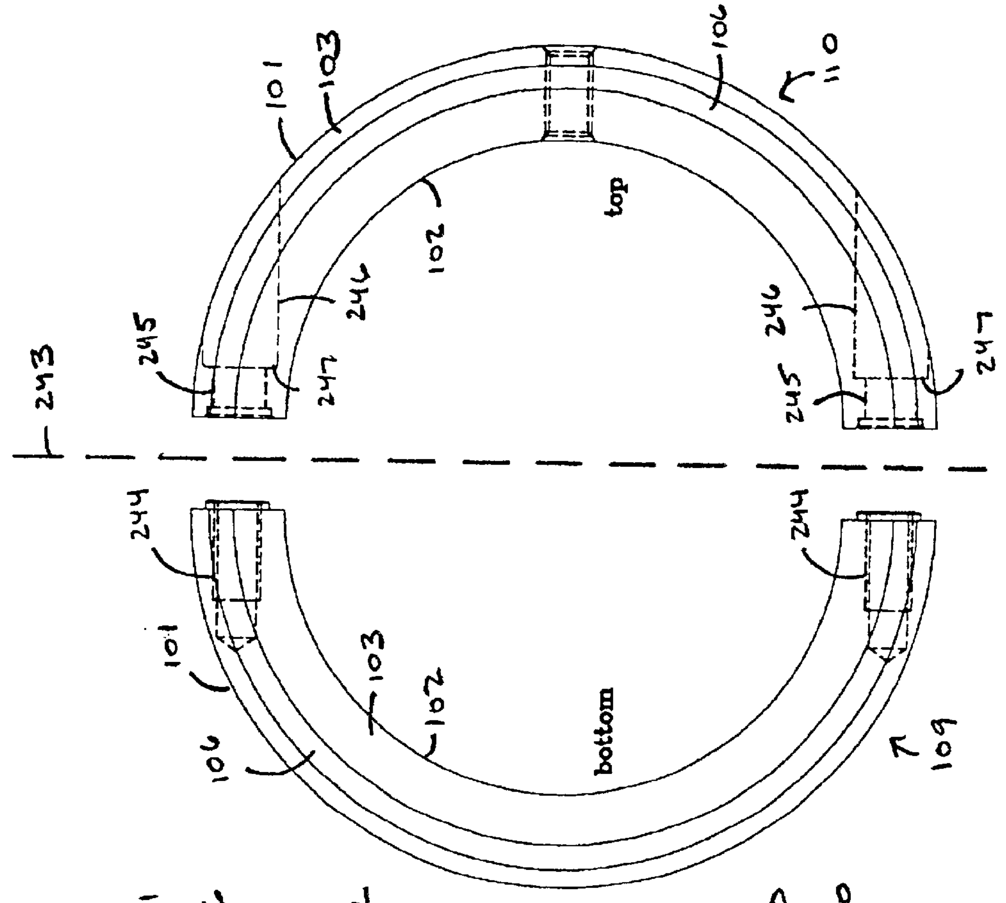
FIG. 17 shows a side view of the split slitter of FIG. 1 with the top and bottom semi-circular slitter members unmated.
Figure 16:
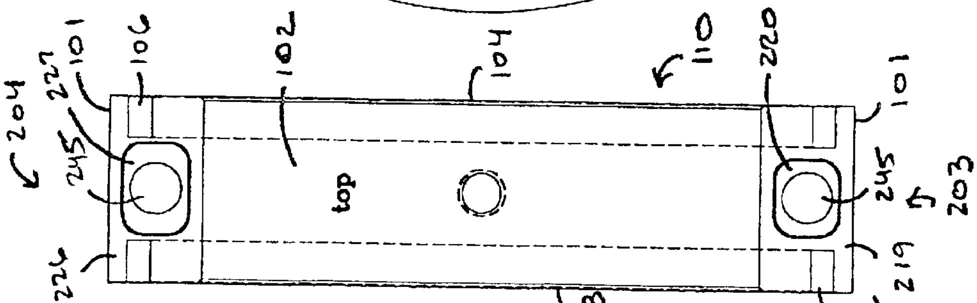
FIG. 16 shows a bottom view of the top semi-circular slitter member of the split slitter of FIG. 1 configured to mate with the bottom semi-circular slitter member shown in FIG. 15.
Figure 15:
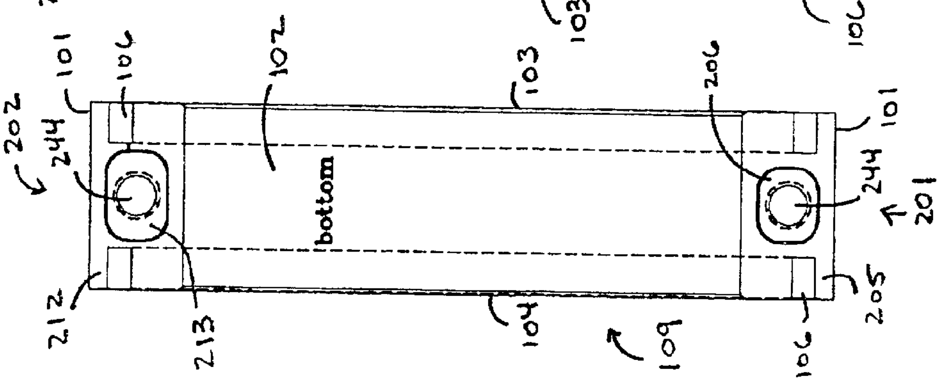
FIG. 15 shows a top view of the bottom semi-circular slitter member of the split slitter of FIG. 1.

Another advantage to the mating ends of the embodiment shown in FIGS. 15–17 is that lands 206 and 213 do not have any right angle corners along their top edges. As a result, the mating ends 201, 202, 203 204 of members 109 and 110 are less susceptible to stress cracking during heat treating and are also less likely to be damaged during assembly and disassembly of slitter 100.

Figure 7:
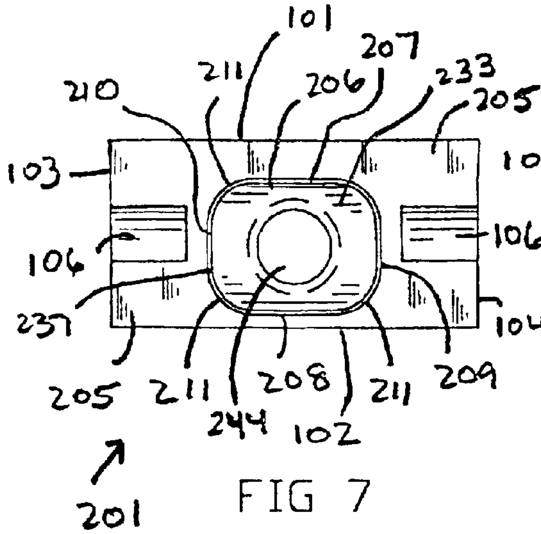
FIG. 7 shows an end view of one of the mating ends of the bottom slitter member of the split slitter of FIG. 1 having a small land having radiused corners projecting therefrom.
Figure 8:
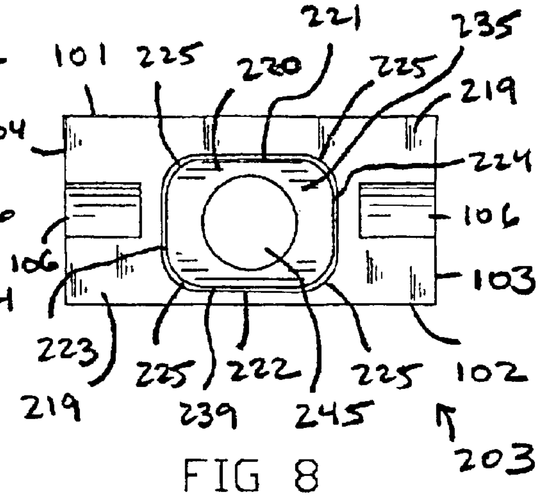
FIG. 8 shows an end view of one of the mating ends of the top slitter member of the split slitter of FIG. 1 having a small recess having radiused corners protruding therein for receiving the small land shown in FIG. 7.
Figure 9:
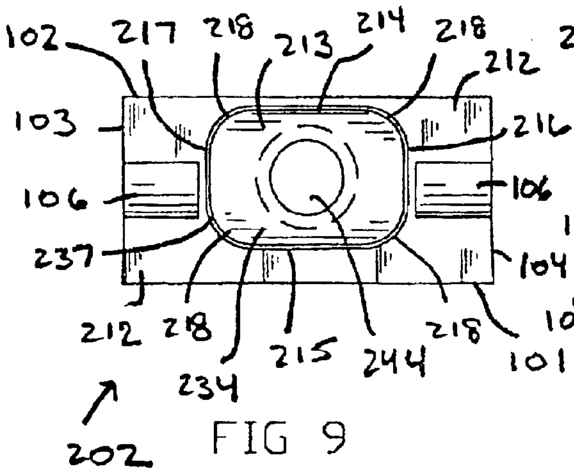
FIG. 9 shows an end view of the other of the mating ends of the bottom slitter member of the split slitter of FIG. 1 having a large land having radiused corners projecting therefrom.
Figure 10:
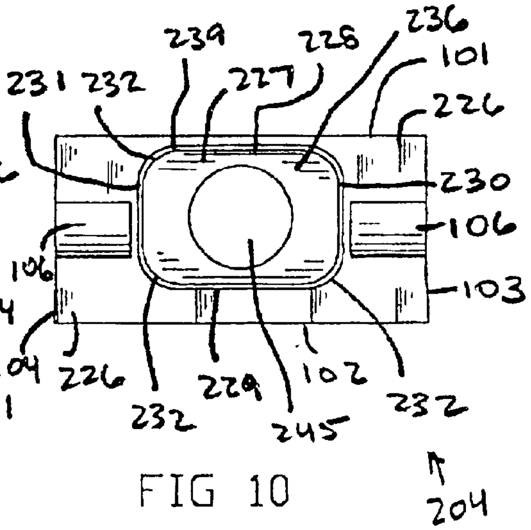
FIG. 10 shows an end view of the other of the mating ends of the top slitter member of the split slitter of FIG. 1 having a large recess having radiused corners protruding therein for receiving the large land shown in FIG. 9.
Figure 14:
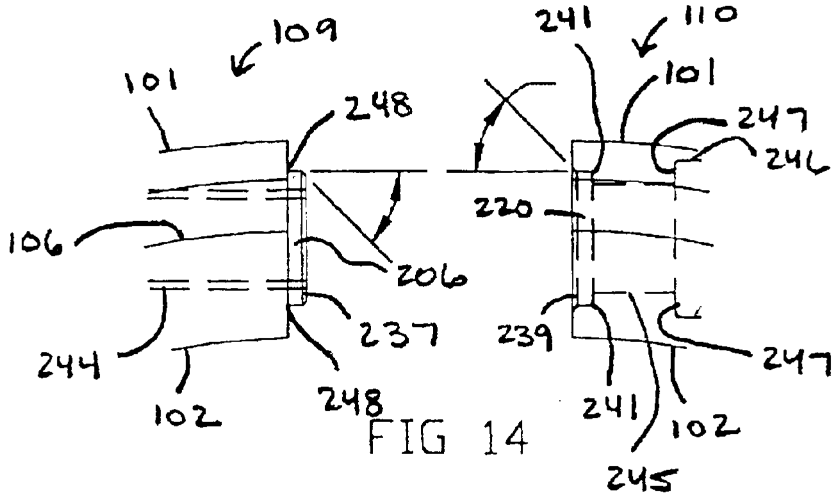
FIG. 14 shows a close-up side view of one of the pairs of mating ends of the split slitter of FIG. 1 with the top and bottom slitter members unmated.

The top edge 237 of each land 206, 213 formed between the top surfaces 233, 234 of each land 206, 213 respectively and the sidewalls of each land is chamfered or beveled in this embodiment. This is best shown in FIGS. 7, 9, and 14. Likewise, top edges 239 of each recess 220, 227 formed between the mating surfaces 219, 226 respectively and the sidewalls of each recess is also chamfered or beveled in this embodiment (see FIGS. 8, 10 and 14).

Chamfering the top edges 237 of each land also provides a clearance gap between these corners and the inside bottom corners 241 (see FIG. 14) of recesses 220, 227 that are formed between the bottom surface 235, 236 of each recess and the sidewalls of each recess. Similarly, chamfering the top edges 239 of each recess also provides a clearance gap between these corners and the corners 248 that are formed at the base of each land 206, 213 (see FIG. 14) that are formed between the sidewall surfaces of the lands and the mating surface from which the land projects.

These clearance gaps are desirable because they allow for less stringent requirements in making corners 241 and 248. As the cutting tools become dull, these corners have a tendency to develop an undesirable radius. A sharp right angle corner on the top edge 237 of each land could easily interfere with the bottom recess corners 241 if those bottom corners became undesirably radiused. Likewise, a sharp right angle corner on the top edge 239 of each recess could easily interfere with corners 248 if those corners became undesirably radiused.

It should also be noted that the height of lands 206 and 213 is typically less than the depth of recesses 220 and 227. This insures that mating surfaces 205 and 212 will come into physical contact with mating surfaces 219, 226 respectively when member 109 is fully mated with member 110. In the embodiment of FIG. 1, for instance, the height of each land is 0.060 inches while the depth of each recess is 0.065 inches.

Making the depth of the recess greater than the height of the land can also be used to prevent interference between the top edge 237 of the lands and the bottom corners 241 of the recesses in the event the bottom corners develop an undesirable radius. This is especially desirable for embodiments of the present invention where the top edge 237 of the land is not chamfered or beveled.

Lands 206, 213 are each provided with a threaded aperture 244 having an opening that is substantially parallel with planar mating surfaces 205, 212 and its longitudinal axis substantially perpendicular to mating surfaces 205, 212 and tangential with the circumference of the semi-circular member 109. Threaded aperture 244 does not extend to outer radial surface 101 in the embodiment shown in FIG. 1, but rather terminates inwardly from the radial surface 101 in this embodiment. In other embodiments, threaded aperture 244 does extend all the way to outer radial wall 101.

In a similar manner, each recess 220, 227 is provided with an open-ended slot or bore 245 having the plane of its opening substantial parallel with the planar mating surfaces 219, 226 and its longitudinal axis substantially perpendicular to the planar mating surfaces 219, 226 and tangential with the circumference of semi-circular member 110. Bore 245 opens at its other end in outer radial surface 101 for accommodating an appropriate interconnecting member.

As best shown in FIGS. 15–17, semi-circular members 109 and 110 are conjoined or interconnected by a bolt member or set screw (not shown) having a head and threaded shank portion. Bore 245 is provided with a section of enlarged diameter 246 terminating with shoulder 247, and on engagement of the two semi-circular members 109 and 110, the bolt member is turned until its head is seated against or abuts shoulder 247, thereby assuring a rigid connection between the mating ends of semi-circular members 109, 110.

Figure 4:
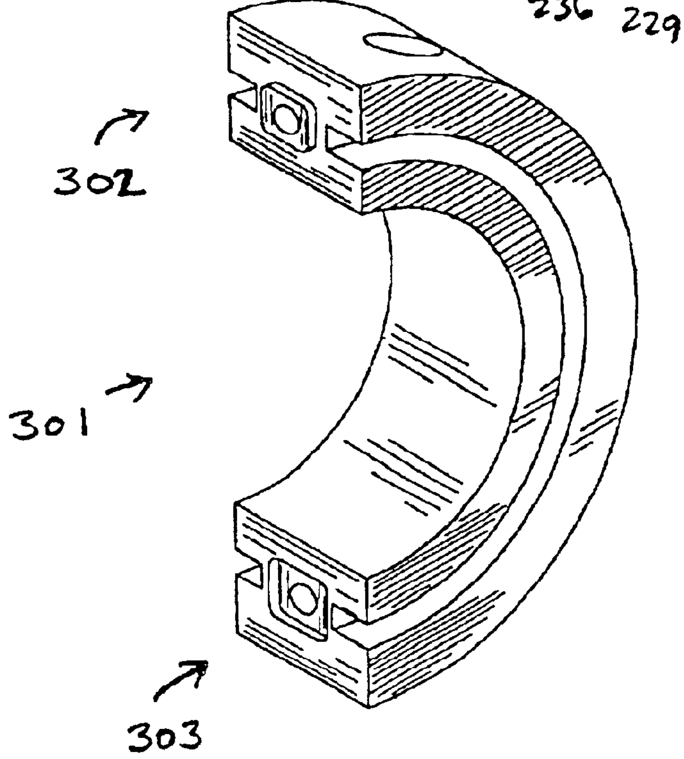
FIG. 4 shows an isometric view of an alternative slitter member according to another embodiment of the present invention.
Figure 5:
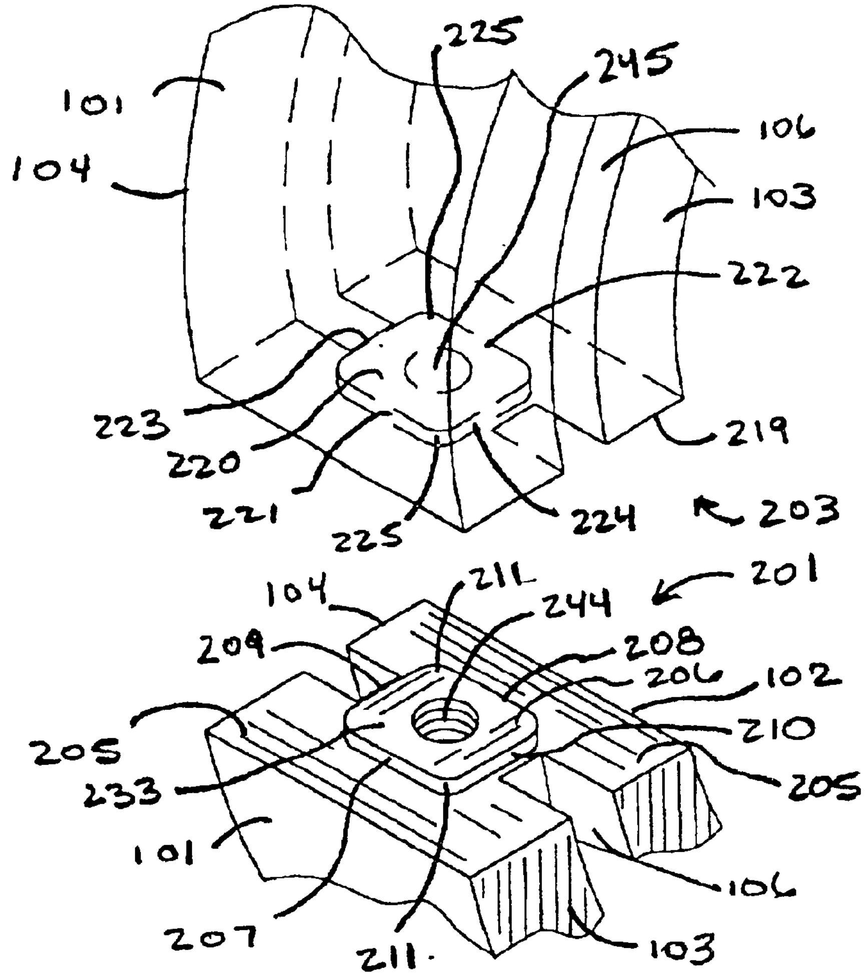
FIG. 5 shows an isometric close-up view of one of the pairs of mating ends of the split slitter of FIG. 1 with the top and bottom slitter members unmated.

FIG. 4 shows an alternative semi-circular member 301 having mating ends 302 and 303. As with the slitter shown in FIG. 1, semi-circular member 301 mates with a second semi-circular member (not shown) to form an open-ended cylindrical split slitter. The other semi-circular member that is not shown includes a pair of mating ends that are complimentary to mating ends 302 and 303.

The main difference between semi-circular member 301 and members 109 and 110 is that instead of having mating ends that include only lands or only recesses, member 301 includes one mating end having a land and one mating end having a recess. By its very nature, this particular configuration prevents semi-circular member 301 from being mated incorrectly with its complementary semi-circular mating member. As such, there is no need to use different size lands or recesses in this embodiment, although there is nothing that prevents one from doing so.

Figure 12:
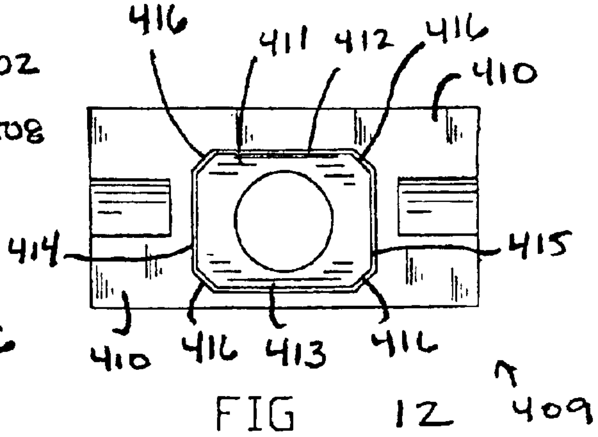
FIG. 12 shows an end view of an alternative mating end of a slitter member having a rectangular recess with chamfered corners protruding therein for receiving the land shown in FIG. 11.
Figure 11:
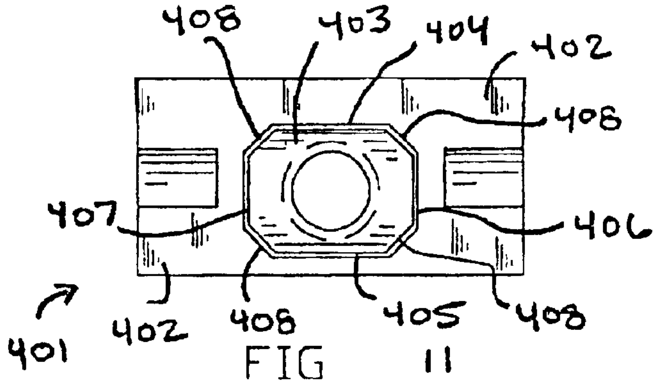
FIG. 11 shows an end view of an alternative mating end of a slitter member having a rectangular land with chamfered corners protruding therefrom.

FIGS. 11 and 12 show an alternative mating arrangement according to another embodiment of the present invention. FIG. 11 shows a mating end 401 including a planar mating surface 402 and a centrally disposed rectangular land 403 projecting from planar mating surface 402. Single-level land 403 includes a first pair of parallel or substantially parallel opposed sidewall surfaces 404, 405 and a second pair of parallel or substantially parallel opposed sidewall surfaces 406, 407. The corners 408 of land 403 formed by adjacent sidewalls are not, however, radiused to a desired value in this embodiment. Rather, corners 408 are chamfered or beveled in this embodiment.

Figure 18:
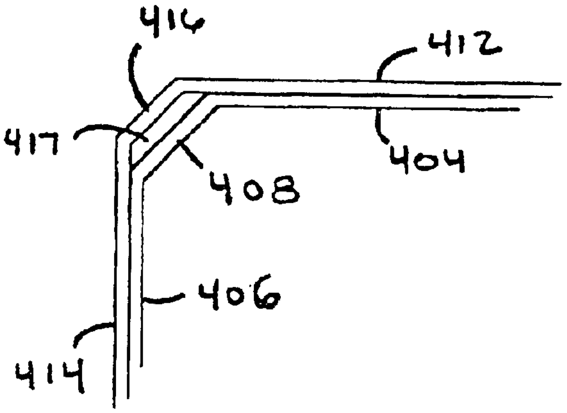
FIG. 18 shows a land having chamfered corners received in a recess also having chamfered corners according to one embodiment of the present invention.

FIG. 12 shows a mating end 409 that is complimentary to mating end 401. Mating end 409 includes a planar mating surface 410 and a rectangular recess 411 protruding into mating surface 410. Single-level recess 411 includes a first pair of parallel or substantially parallel opposed sidewalls 412, 413 and a second pair of parallel or substantially parallel opposed sidewalls 414, 415. The corners 416 of recess 411 formed by adjacent sidewalls are also chamfered in this embodiment. The length of chamfered corners 416 of recess 411 are less than the length of chamfered corners 408 of land 403. As a result, a clearance gap 417 is provided between corners 408 and corners 416 when land 403 is received in recess 411 (see FIG. 18).

Precision alignment in both the axial and radial directions between mating ends 401 and 409 is provided in this embodiment in a similar manner to that previously described. Namely, planar sidewall surfaces 406, 407 contact planar sidewall surfaces 414, 415 respectively when land 403 is received in recess 411 to provide axial alignment of mating end 401 with mating end 409. Radial alignment of mating end 401 with mating end 409 is provided by contacting planar sidewall surfaces 404, 405 with planar sidewall surfaces 412, 413 respectively when land 403 is received in recess 411.

Figure 13:
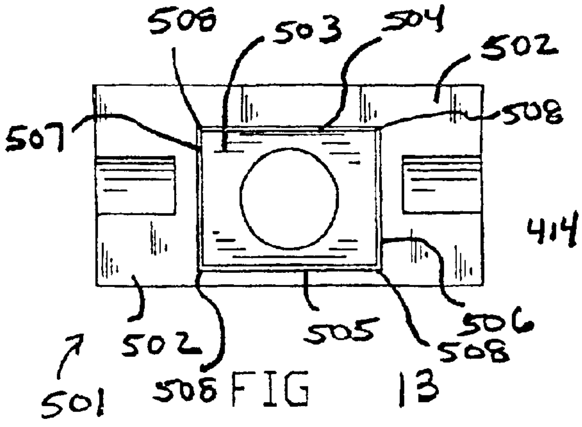
FIG. 13 shows an end view of an alternative mating end of a slitter member having a rectangular recess with 90 degree corners protruding therein.

FIG. 13 shows an alternative mating end 501 according to yet another embodiment of the present invention. Mating end 501 includes a mating surface 502 and a rectangular recess 503 projecting into mating surface 502. Single-level recess 503 includes a first pair of parallel or substantially parallel opposed sidewall surfaces 504, 505 and a second pair of parallel or substantially parallel opposed sidewall surfaces 506, 507. The corners 508 of recess 503 formed by adjacent sidewalls are not, however, radiused or beveled in this embodiment. To the contrary, corners 507 in this embodiment are substantially right angle corners (90 degree corners).

It should be noted that it is probably not possible to precision machine recesses 411 and 503 using conventional machining techniques. Rather, a special machining process, such as electrical discharge machining (EDM) would be required.

Figure 21:
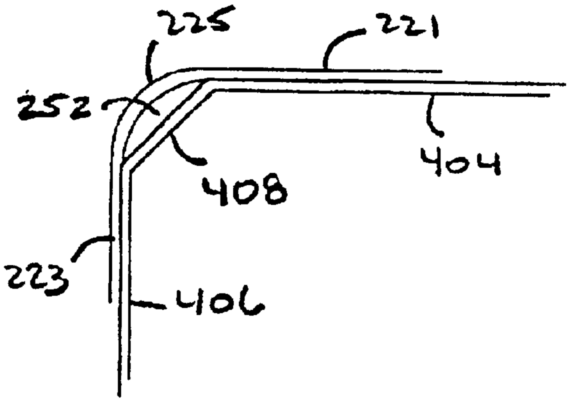
FIG. 21 shows a land having chamfered corners received in a recess having radiused corners according to one other embodiment of the present invention.
Figure 19:
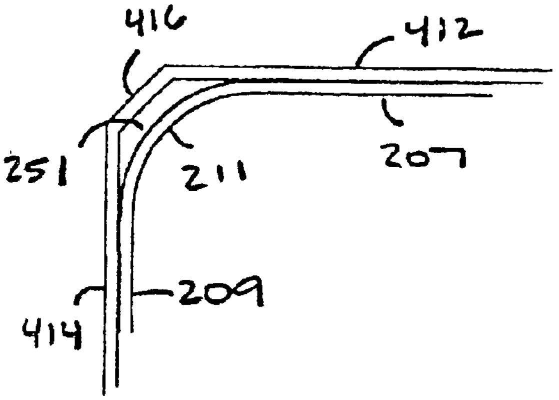
FIG. 19 shows a land having radiused corners received in a recess having chamfered corners according to another embodiment of the present invention.

It should also be noted that recess 503 of FIG. 13 can be used (e.g., can be complementary to) with lands having chamfered or beveled corners, such as land 403 and lands having radiused corners such as lands 206 and 213 to provide precision alignment in both the axial and radial directions. Likewise, chamfered recess 411 can be used with lands having radiused corners such as lands 206 and 213 to provide precision alignment in both the axial and radial directions, provided that a clearance gap 251 is provided between each radiused land corner and each beveled recess corner as shown in FIG. 19. Finally, radiused recesses 220 or 227 can be used with lands having beveled corners such as land 403 to provide precision alignment in both the axial and radial directions, provided that a clearance gap 252 is provided between each beveled land corner and each radiused recess corner as shown in FIG. 21

As a general guideline, it is desirable to maintain at least fifty percent of the length of each land or recess sidewall surface for use as an alignment surface. In other words, it is preferable, but not required, that the land corner radii or chamfer be chosen such that at least fifty percent of the length of the land sidewalls remain in contact with the recess sidewalls to provide the desired alignment. The reason for this is that over time, the sidewall surfaces of both the lands and the recesses become worn in places. As the sidewall surfaces wear, they are less capable of providing the desired alignment. If the alignment contact area between the land and recess sidewalls is initially small, this wear could significantly impact the mating arrangement's ability to maintain alignment of the parts over time.

Although the present invention has been illustrated with rectangular lands 206, 213 and rectangular recesses 220, 227, the present invention is not limited to the use of rectangular lands and recesses. In other embodiments, other shapes are used. In general, according to one aspect of he invention, the present invention includes any centrally disposed single-level land (of any shape) and any centrally disposed single-level recess (of any shape) combination that includes (1) a first pair of centrally disposed planar or substantially planar sidewall surfaces on the land which provide alignment in the axial direction by way of contact with a complimentary first pair of centrally disposed planar or substantially planar sidewall surfaces of the recess and (2) a second pair of centrally disposed planar or substantially planar sidewall surfaces on the land which provide radial alignment by way of contact with a complimentary second pair of centrally disposed planar or substantially planar sidewall surfaces of the recess.

Numerous modifications may be made to the present invention which still fall within the intended scope hereof. Thus, it should be apparent that there has been provided in accordance with the present invention a method and apparatus for axially and radially aligning the two halves of a split slitter or other similar device that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A slitter apparatus comprising:

a first semi-circular member having first and second mating surfaces;

a second semi-circular member having first and second mating surfaces complimentary to the opposed first and second mating surfaces of the first member;

wherein the first member is engageable with the second member to form on engagement a cylindrical body;

a first rectangular land having a plurality of sidewall surfaces projecting from one of the first or second mating surfaces of the first member wherein the corners formed between adjacent sidewall surfaces of the first rectangular land are radiused;

a first rectangular recess having a plurality of sidewall surfaces projecting into one of the first or second mating surfaces of the second member wherein the corners formed between adjacent sidewall surfaces of the first rectangular recess are radiused;

wherein the radius of each corner formed between adjacent sidewall surfaces of the first rectangular recess is less than the radius of the corresponding corner formed between adjacent sidewall surfaces of the first rectangular land; and wherein the first rectangular recess is interengageable with the first rectangular land to provide axial and radial alignment of the first member with the second member.

2. A slitter apparatus comprising:

a first semi-circular member having first and second mating surfaces;

a second semi-circular member having first and second mating surfaces complimentary to the opposed first and second mating surfaces of the first member;

wherein the first member is engageable with the second member to form on engagement a cylindrical body;

a first rectangular land having a plurality of sidewall surfaces projecting from one of the first or second mating surfaces of the first member wherein the corners formed between adjacent sidewall surfaces of the first rectangular land are radiused;

a second rectangular land having a plurality of sidewall surfaces projecting from the other of the first or second mating surfaces of the first member wherein the corners formed between adjacent sidewall surfaces of the second rectangular land are radiused;

a first rectangular recess having a plurality of sidewall surfaces projecting into one of the first or second mating surfaces of the second member;

a second rectangular recess having a plurality of sidewall surfaces projecting into the other of the first or second mating surfaces of the second member;

wherein the first rectangular recess is interengageable with the first rectangular land to provide axial and radial alignment of the first member with the second member;

wherein the second rectangular recess is interengageable with the second rectangular land to provide axial and radial alignment of the first member with the second member; and wherein the first rectangular land is interengageable with the first rectangular recess, and further wherein the first rectangular land is not interengageable with the second rectangular recess, whereby the first and second semi-circular members may be connected together only in one way to form the cylindrical body.

3. A slitter apparatus comprising:

a first semi-circular member having a first mating surface;

a second semi-circular member having a second mating surface engageable with the first mating surface to form a cylindrical body;

a rectangular land projecting from the first mating surface of the first semi-circular member wherein the land includes no more than one planar surface substantially parallel to the first mating surface and further wherein the land includes a plurality of sidewall surfaces projecting from the first mating surface wherein the corners formed between adjacent sidewall surfaces of the rectangular land are chamfered;

a rectangular recess protruding into the second mating surface of the second semi-circular member wherein the recess includes no more than one planar surface substantially parallel to the second mating surface and further wherein the recess includes a plurality of sidewall surfaces projecting into the second mating surface wherein the corners formed between adjacent sidewall surfaces of the rectangular recess are chamfered;

wherein the length of the chamfer on each corner formed between adjacent sidewall surfaces of the rectangular recess is less than the length of the chamfer on the corresponding corner formed between adjacent sidewall surfaces of the rectangular land; and wherein engagement of the land with the recess provides both axial and radial alignment of the first semi-circular member with the second semi-circular member.

4. A slitter apparatus comprising;

a first semi-circular member having a first mating surface;

a second semi-circular member having a second mating surface engageable with the first mating surface to form a cylindrical body;

a rectangular land projecting from the first mating surface of the first semi-circular member wherein the land includes no more than one planar surface substantially parallel to the first mating surface and further wherein the land includes a plurality of sidewall surfaces projecting from the first mating surface wherein the corners formed between adjacent sidewall surfaces of the rectangular land are radiused;

a rectangular recess protruding into the second mating surface of the second semi-circular member wherein the recess includes no more than one planar surface substantially parallel to the second mating surface and further wherein the recess includes a plurality of sidewall surfaces projecting into the second mating surface wherein the corners formed between adjacent sidewall surfaces of the rectangular recess are radiused;

wherein the radius of each corner formed between adjacent sidewall surfaces of the rectangular recess is less than the radius of the corresponding corner formed between adjacent sidewall surfaces of the rectangular land; and wherein engagement of the land with the recess provides both axial and radial alignment of the first semi-circular member with the second semi-circular member.

* * * * *